United States Patent
Huber et al.

(10) Patent No.: US 12,503,564 B2
(45) Date of Patent: Dec. 23, 2025

(54) PLASTIC RECYCLING SYSTEM USING SOLVENT-TARGETED RECOVERY AND PRECIPITATION (STRAP)

(71) Applicant: Wisconsin Alumni Research Foundation, Madison, WI (US)

(72) Inventors: George Huber, Middleton, WI (US); Zhuo Xu, Madison, WI (US); Kevin Sanchez-Rivera, Madison, WI (US); Ezra Bar-Ziv, Houghton, MI (US); Shreyas Kolapkar, Houghton, MI (US); Victor Ierulli, Houghton, MI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 638 days.

(21) Appl. No.: 17/892,573

(22) Filed: Aug. 22, 2022

(65) Prior Publication Data
US 2024/0059858 A1  Feb. 22, 2024

(51) Int. Cl.
*C08J 11/08* (2006.01)
(52) U.S. Cl.
CPC ..................... *C08J 11/08* (2013.01)
(58) Field of Classification Search
USPC .......................................................... 521/42
See application file for complete search history.

(56) References Cited

U.S. PATENT DOCUMENTS 5,198,471 A * 3/1993 Nauman .................. C08J 11/08
521/46.5

FOREIGN PATENT DOCUMENTS

| EP | 3950796 A1 | 2/2022 |
|---|---|---|
| PL | 190053 B1 * | 10/2005 |
| WO | WO 2022/029318 A1 | 2/2022 |

OTHER PUBLICATIONS

PL190053B1 Machine Translation (Year: 2005).*
Sánchez-Rivera et al., "Reducing Antisolvent Use in the STRAP Process by Enabling a Temperature-Controlled Polymer Dissolution and Precipitation for the Recycling of Multilayer Plastic Films," *ChemSusChem* 2021, 14, 4317-4329.
Walker et al., "Recycling of multilayer plastic packaging materials by solvent-targeted recovery and precipitation," *Sci. Adv.* 2020; 6: eaba7599.
Pappa, Georgia, et al., "The selective dissolution/precipitation technique for polymer recycling: a pilot unit application." *Resources, conservation and recycling*, Elsevier, Amsterdam, NL, vol. 34(1), Dec. 1, 2001 (Dec. 1, 2001), pp. 33-44, XP004311746, ISSN: 0921-3449, DOI: 10.1016/S0921-3449 (01) 00092-1.
International Search Report and Written Opinion dated Dec. 13, 2023, from PCT Application No. PCT/US2023/072552.
"Screw Conveyor Components & Design", from Conveyor Engineering & Manufacturing Co., 2012.
Lyn Bates, "Guide to the Design, Selection, and Application of Screw Feeders", Professional Engineering Publishing Limited, UK, 2000, ISBN 1 86058 285 0.
Communication pursuant to Rule 114(2) EPC dated Nov. 5, 2025, from European Patent Application No. 23768761.1.

* cited by examiner

*Primary Examiner* — Terressa Boykin
(74) *Attorney, Agent, or Firm* — Joseph T. Leone; Yanjun Ma; DeWitt LLP

(57) ABSTRACT

A system to carry out solvent targeted recovery and precipitation (STRAP) to recover individual polymers from multilayer plastic films or mixed plastic wastes, comprising a down-sizing device to shred the plastic wastes into particles with a size and aspect ratio to be flowable; a feeder that conveys the plastic particles in a constant flow without bridging; a dissolution vessel to selectively dissolve an individual polymer component in a solvent; a high temperature filter to separate the dissolved polymer component from the undissolved plastics; a precipitator to precipitate the dissolved polymer component; a low temperature filter to separate the precipitated polymer component from the solvent; and a distillation unit to purify the recycled solvent. The unique design of the feeder and the dissolution vessels allows the system to run in a semi-continuous mode.

18 Claims, 9 Drawing Sheets

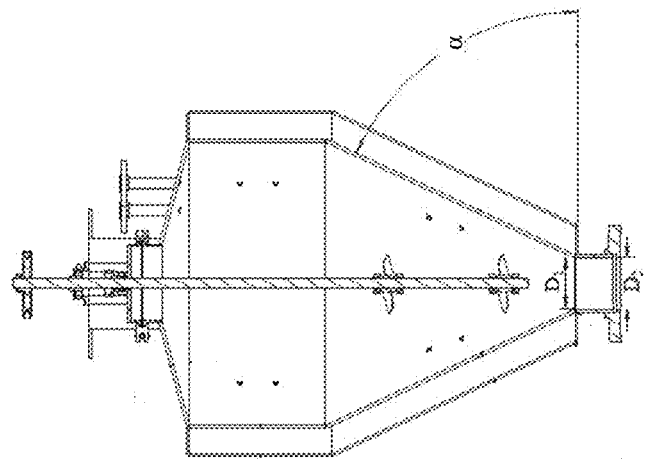
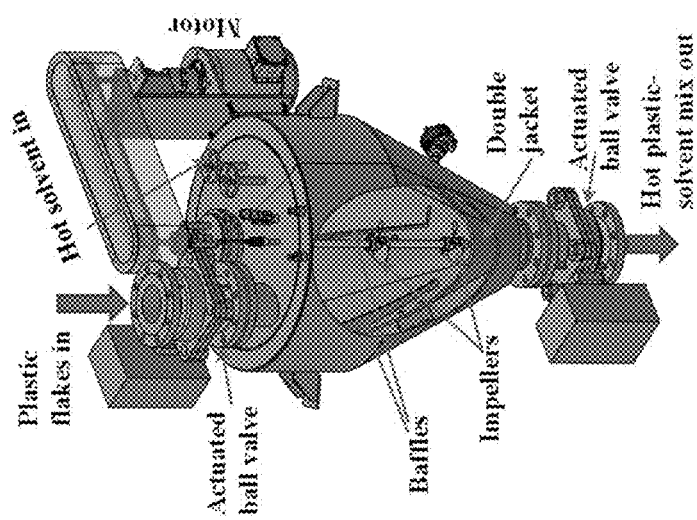
Fig. 4A
Fig. 4B

PLASTIC RECYCLING SYSTEM USING SOLVENT-TARGETED RECOVERY AND PRECIPITATION (STRAP)

FEDERAL FUNDING STATEMENT

This invention was made with government support under DE-EE0009285 and DE-SC0018409 awarded by the US Department of Energy and under 2033366 and 2222041 awarded by the National Science Foundation. The government has certain rights in the invention.

BACKGROUND

The generation of plastic has been increasing globally, but the plastic recycling infrastructure is still lacking. The current mechanical recycling technologies are costly, and the efficiency is not satisfactory for plastic wastes. The majority of non-recycled plastic waste is landfilled, with some being recovered for energy. Some ends up in the ocean and in inland waterways. This is causing significant damage to both the environment and to human health.

A large share of the plastic packaging materials made and used today are composite films made of multiple different layers. The combination of several layers of different materials improves the mechanical and physical properties of the film. Current strategies to recycle plastic packaging materials rely on mechanical separations to sort plastic materials by type. This allows for them to be melted down and pelletized. These methods are incompatible with layered composite films, as melting them down in bulk recombines all the layers into a mixture that does not share the same bulk properties as the original material. Catalytic methods have been used to decompose polymeric materials into their original monomers. However, these strategies often require stoichiometric amounts of reagents, which is expensive and wasteful. Pyrolysis technologies have been proposed whereby composite films are decomposed at high temperatures in the absence of oxygen to form liquid fuel precursors. However, these technologies typically suffer from low yields, and require harsh process conditions.

To address the unmet need in the art for efficient recycling of plastic wastes, a process named solvent targeted recovery and precipitation (STRAP) has been developed. The STRAP process efficiently recovers the components of multilayer plastic films or mixed plastic wastes using the selective dissolution of the individual plastic components guided by thermodynamic calculations of polymer solubility (Walker et al., *Sci. Adv.* 2020; 6: eaba7599; Sanchez-Rivera et al., *ChemSusChem* 2021, 14, 4317-4329). Techno-economic and life cycle analyses have provided evidence that STRAP can have extremely low capital and operating costs as well as lower process energy requirements than the production of fossil-based resins. This can help reduce the amount of plastic waste that ends up in landfills or the environment and lead to a circular plastics economy. The present disclosure is directed to a system to carry out the STRAP process and recover individual polymers from multilayer plastic films or mixed plastic wastes.

SUMMARY

Disclosed herein is a system to recover an individual polymer from a multilayer plastic film or a mixed plastic waste. The system comprising:

(i) a down-sizing device that shreds the multilayer plastic film or the mixed plastic waste into plastic particles having a size and aspect ratio to be flowable;
(ii) a feeder that conveys the plastic particles in a constant flow without bridging;
(iii) a dissolution vessel that mixes the plastic particles with a solvent, wherein the solvent selectively dissolves an individual polymer component of the plastic particles;
(iv) a high temperature filter that separates the solvent containing the dissolved polymer component from undissolved plastic particles;
(v) a precipitator that precipitates the dissolved polymer component; and
(vi) a low temperature filter that separates the precipitated polymer component from the solvent.

Preferably, the down-sizing device of the system shreds the multilayer plastic film or the mixed plastic waste into plastic particles having a size of about 1 mm to 6 mm and an aspect ratio of about 1 to 1.5.

The feeder is a live-bottom hopper comprising a bin with negative angled walls that form a wider base than the top, and one or more variable pitch screws having increasing pitches along the flow of the plastic particles.

The dissolution vessel is a conical reactor as shown in FIGS. 4A and 4B, and comprises baffles attached to an inner wall to promote mixing. Referring now to FIG. 4B, in the preferred configuration of the dissolution vessel, the outlet diameters $D_1$ and $D_2$ are equal (although this is not required). The ratio of $D_1$ to the particle size of the incoming feedstock is preferably $\geq 15$ and $\alpha$ (the angle between the transverse cross-sectional plane of the outlet and the vessel sidewall) is between 45 degrees to 90 degrees. (See FIG. 4B.)

In some cases, the dissolved polymer component is precipitated in the precipitator by lowering the temperature of the solvent containing the dissolved polymer component. In some cases, the dissolved polymer component is precipitated in the precipitator by adding an antisolvent.

The system further comprises a first solvent recovery unit following the high temperature filter to recover the solvent from the undissolved plastic particles separated from the high temperature filter, and a second solvent recovery unit following the low temperature filter to recover the solvent from the precipitated polymer component separated from the low temperature filter.

The system further comprises an extruder following the second solvent recovery unit to extrude the polymer component to produce recycled plastic resin pellets and remove the remaining solvent from the polymer component.

The system may further comprise a heat management system that controls temperature of the solvent entering the dissolution vessel, the dissolution vessel, the high temperature filter, the precipitator, and the first and second solvent recovery units.

The system may further comprise a distillation unit to purify the recovered solvent for reuse.

To recover a second polymer component from the multilayer plastic film or the mixed plastic waste, the system optionally further comprises a sequential subsystem comprising a second dissolution vessel, a second high temperature filer, a second precipitator, and a second low temperature filter, wherein the undissolved plastic particles are conveyed to the second dissolution vessel to mix with a second solvent, wherein the second solvent selectively dissolves the second polymer component. The system may comprise one or more parallel subsystems to recover one or more polymer components sequentially from the multilayer plastic film or the mixed plastic waste. In a preferred version of the method, there is a subsystem for each distinct type of plastic within the film being recycled.

The objects and advantages of the disclosure will appear more fully from the following detailed description of the preferred embodiment of the disclosure made in conjunction with the accompanying drawings.

BRIEF DESCRIPTION OF THE DRAWINGS

FIGS. 4A and 4B. show the structure of an exemplary, jacketed dissolution vessel that can be used in the present method and system. FIG. 4A is a partial cutaway, perspective rendering of the vessel; FIG. 4B is a vertical cross-sectional view.

DETAILED DESCRIPTION

Definitions

As used herein, the term "about" refers to ±10% of the variable referenced.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

As used herein, the singular forms "a," "an," and "the" include plural referents unless the content clearly dictates otherwise.

As used herein, the term "or" is an inclusive "or" operator and is equivalent to the term "and/or" unless the context clearly dictates otherwise.

The elements and method steps described herein can be used in any combination whether explicitly described or not, unless otherwise specified or clearly implied to the contrary by the context in which the referenced combination is made.

All combinations of method steps as used herein can be performed in any order, unless otherwise specified or clearly implied to the contrary by the context in which the referenced combination is made.

The system disclosed herein my comprise, consist of, or consist essentially of the various steps and equipment disclosed herein.

It is understood that the disclosure is not confined to the particular elements and method steps herein illustrated and described, but embraces such modified forms thereof as come within the scope of the claims.

Components of the System

Figure 1:
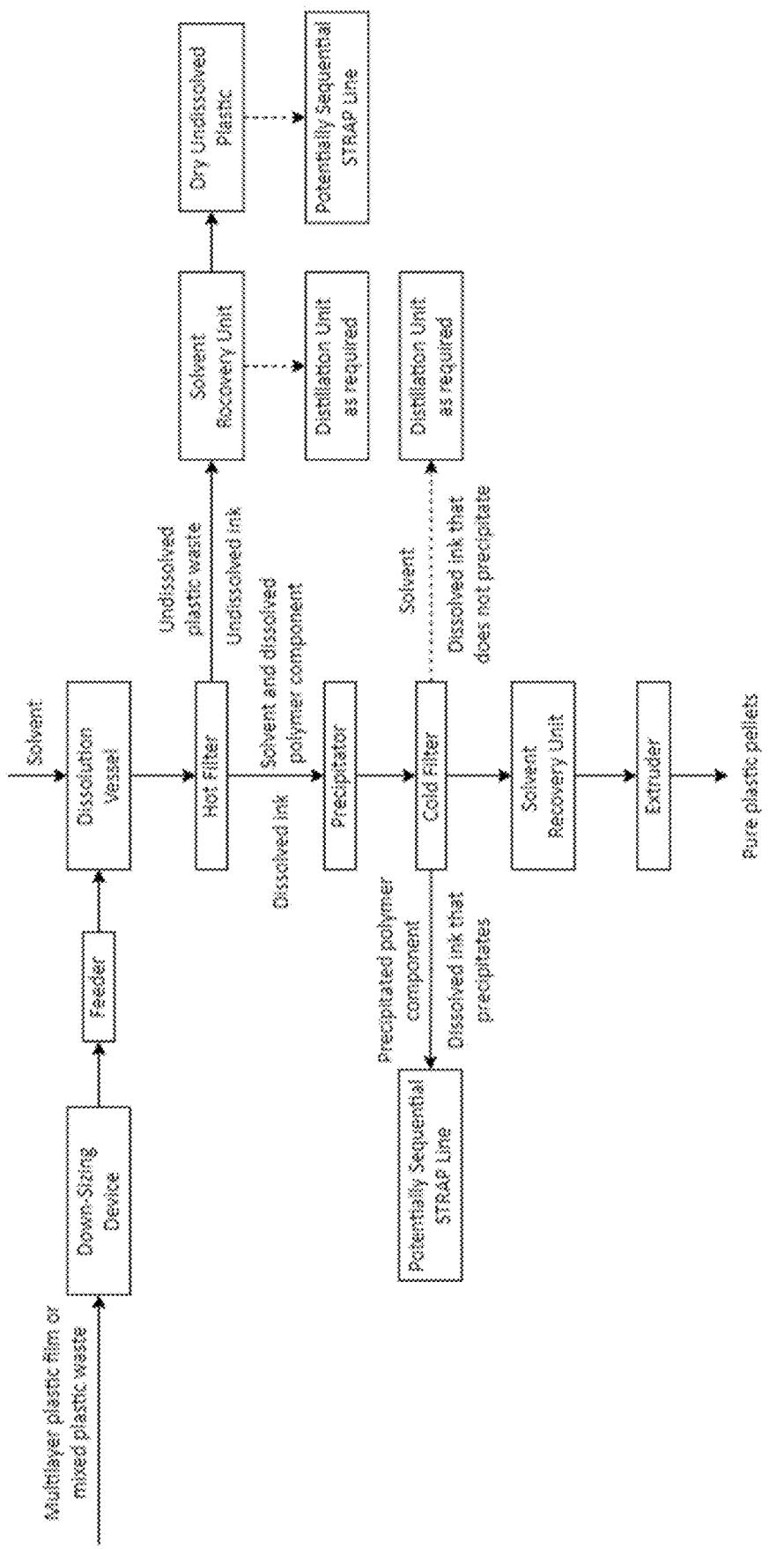
FIG. 1 is a schematic diagram of the system disclosed herein to recover an individual plastic resin from a multi-layer plastic film or a mixed plastic waste.

Disclosed herein is a system to recover individual polymers from multilayer plastic films or mixed plastic wastes. The system can recycle a large variety of plastics from various sources such as flexible plastic films, multilayer plastic packaging waste, post-consumer plastic waste, post-industrial plastic waste, and municipal solid waste. Referring to FIG. 1, the system comprises:

(i) a down-sizing device that shreds the plastic wastes and produces plastic particles having a size and aspect ratio to be flowable and easily dissolvable;

(ii) a feeder that conveys the plastic particles to a dissolution vessel in a constant flow without bridging;

(iii) a dissolution vessel for efficient mixing incoming plastic particles with one or more solvents, and draining the undissolved plastic particles and solvent (which now contains a dissolved polymer component from the incoming feedstock);

(iv) a first filter (preferably a high-temperature or hot filter) that separates undissolved plastics from the solvent containing the dissolved polymer component;

(v) a precipitator to precipitate the dissolved polymer component;

(vi) a second filter (preferably a low-temperature or cold filter) that separates the precipitated polymer component from the solvent;

(vii) a solvent recovery unit that recovers solvents from wet plastics; and (viii) an extruder that produces large quantities of recycled plastic resin pellets and removes the remaining traces of solvent from the recovered resin during the process.

The down-sizing device is typically a shredder that shreds the plastic wastes and produce plastic particles to a desirable certain size and aspect ratio. Preferably, the incoming feedstock is size-reduced to yield a flowable product. Size reduction, by its nature, yields a product having an increased surface area and thus is more easily dissolved. A preferable range of the size of the plastic particles is about 2 mm to 6 mm. A preferable range of the aspect ratio of the plastic particles is about 1 to 1.5. Generating plastic particles that are flowable is critical for operating the system continuously. Further, smaller sizes and appropriate aspect ratios promote fast dissolution and more uniform processing of the plastic particles in the solvent.

Figure 2:
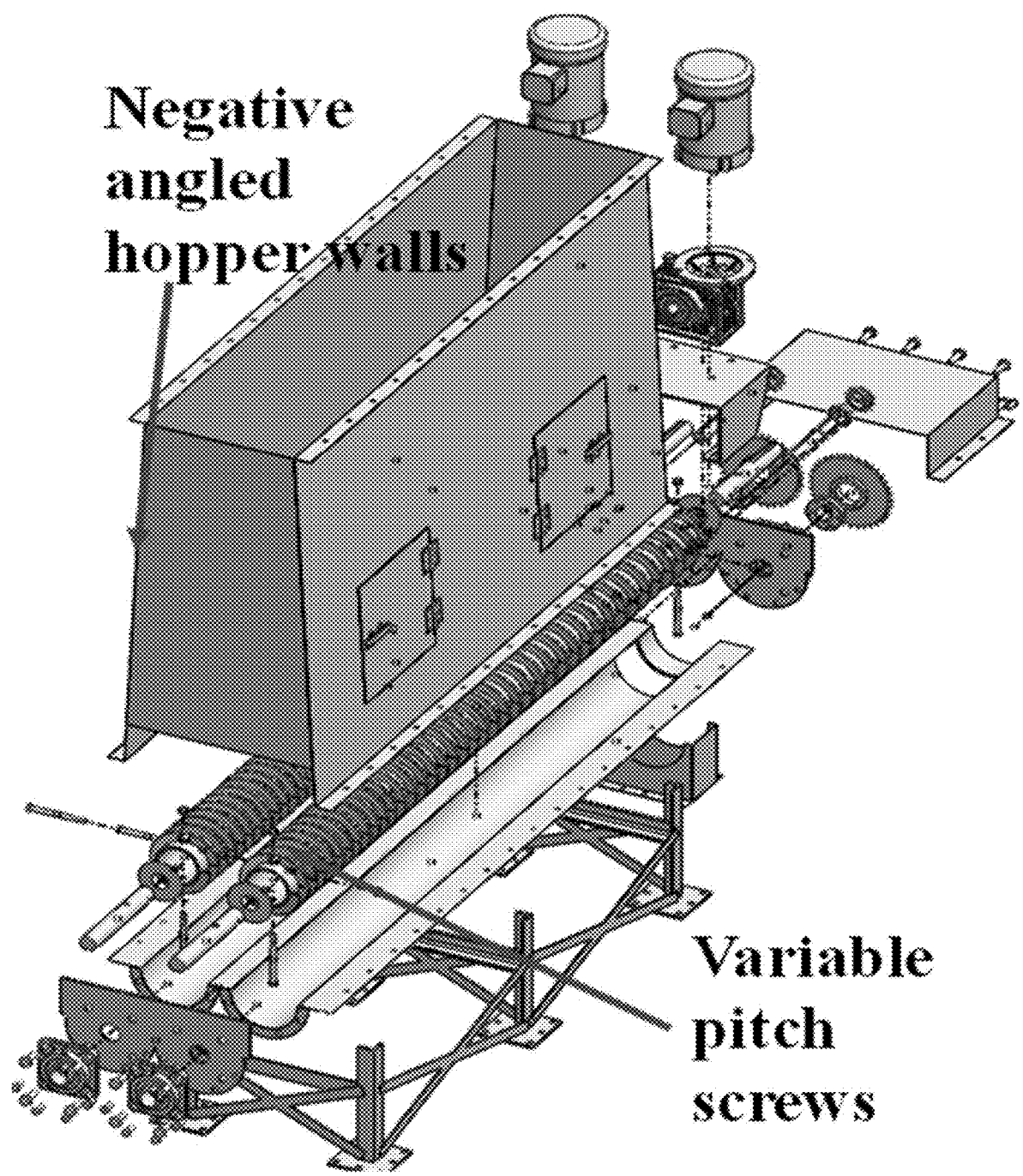
FIG. 2 is an exploded perspective view of a live-bottom hopper having negative-angled walls (wider at bottom than top) and variable-pitch screws.

The feeder following the down-sizing device conveys the plastic particles constantly to the dissolution vessel. In a preferred embodiment, the feeder is a twin-screw, live-bottom hopper as shown in FIG. 2. Other live-bottom hoppers having different configurations may be used; the hopper shown in FIG. 2 is simply a preferred configuration. Compared to traditional live-bottom hoppers having a bin with a narrower base than the top, the live-bottom hopper shown herein has a bin with negative angled walls that form a wider base than top. The live-bottom hopper preferably comprises a pair of variable pitch screws having increasing pitches along the flow of the plastic particles. Through extensive testing, it has been found that the combination of the negative-angled walls with the variable pitch screws increases the height of the plastic particles that can be fed into the hopper without bridging of the incoming feedstock. Bridging of the incoming feedstock is problematic in prior art devices. The shredded plastics tend to be sticky and prone to agglomeration. Bridging the material as it moves through the process causes delay and inefficiency because the bridge must be cleared to ensure uniform feeding of the feedstock into the system.

Figure 3:
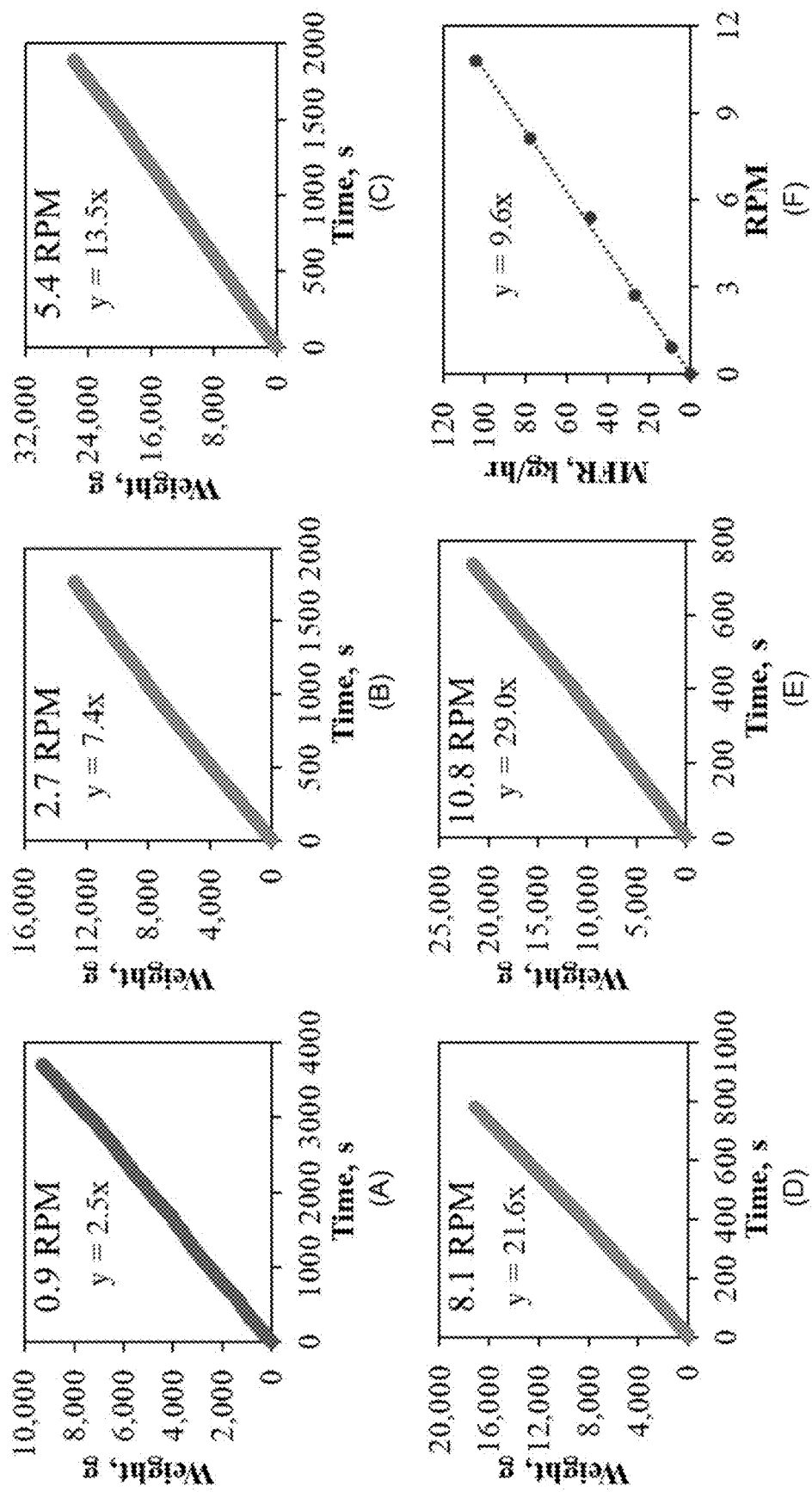
FIG. 3 shows test results of the live-bottom hopper depicted in FIG. 2 operated at different speeds (RPM). The weight of plastics processed by the live-bottom hopper was plotted versus time when the live-bottom hopper was operated at different speeds (panels A-E). A mass flow rate was calculated from each plot of the panels A-E and plotted versus the operation speed as shown in panel F.

The live-bottom hopper shown in FIG. 2 was tested at different speeds and showed a good linear correlation between the operation time and the weight of the plastics processed. See FIG. 3, panels A-E. Each panel shows a different speed at which the hopper was run: 3A=0.9 rpm, 3B=2.7 rpm, 3C=5.4 rpm, 3D=8.1 rpm, 3E=10.8 rpm. At each speed tested, the mass of product delivered was linear with respect to time. The mass flow rates were then calculated from the test at each operation speed and plotted versus the corresponding operation speed (FIG. 3, panel F). The good linear correlation between the operation speed and the mass flow rate indicated that the performance of the live-bottom hopper is constant and controllable when operated at a variety of speeds.

Figure 5:
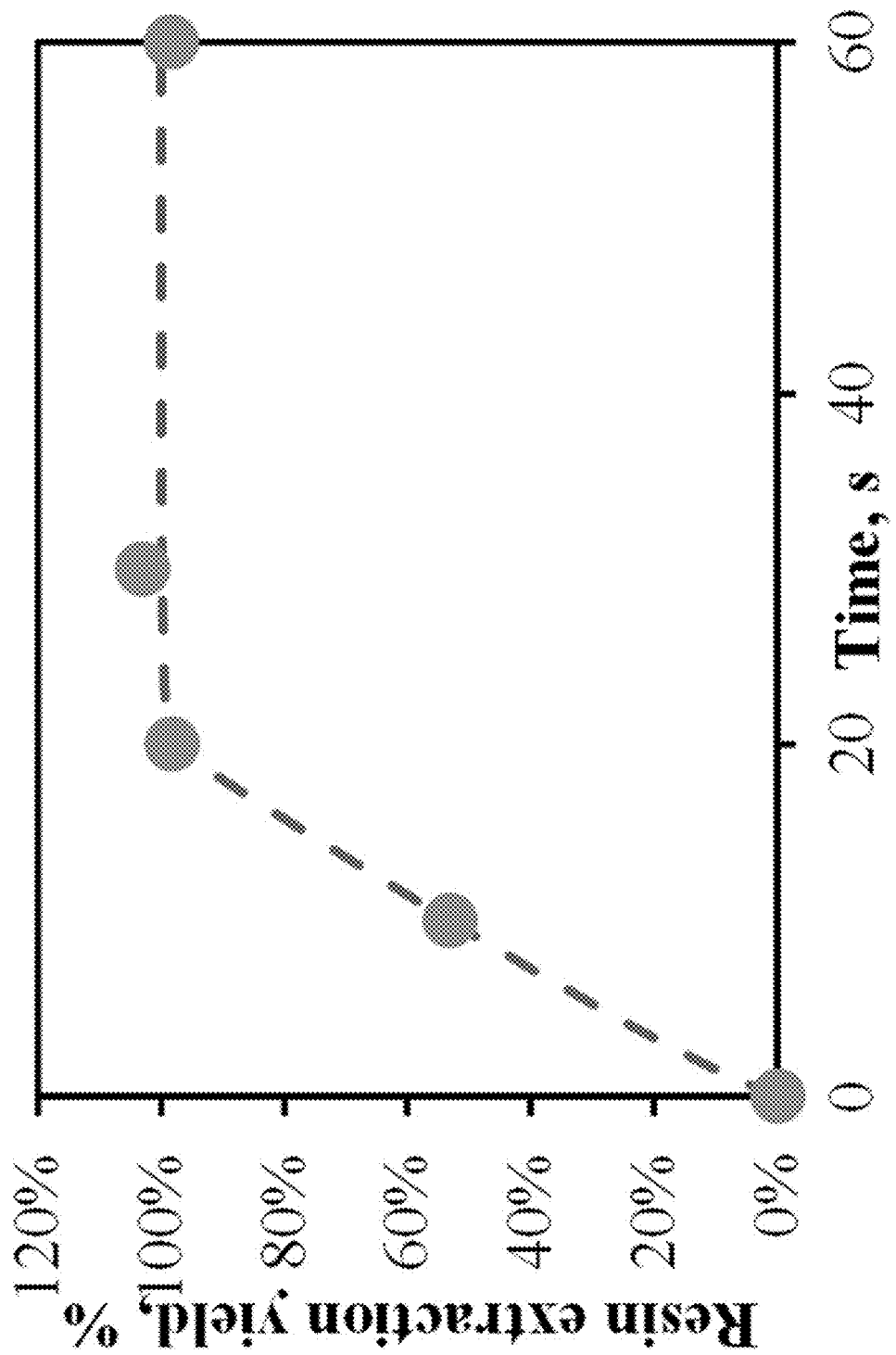
FIG. 5 is a graph depicting dissolution time versus extraction of a specific resin from a multipart polymer film using the dissolution vessel shown in FIGS. 4A and 4B under optimized conditions.

The dissolution vessel receives plastic particles from the feeder and mixes the plastic particles with a solvent that selectively dissolves an individual polymer component of the mixed plastics. The solvent is typically a hot solvent heated to a certain temperature before entering the dissolution vessel. The temperature of the dissolution vessel is also controlled for fast dissolution of a single polymer component within the feedstock. In preferred embodiments, the dissolution vessel has a structure as shown in FIGS. 4A and 4B. The dissolution vessel comprises impellers to mix the materials and baffles attached to the inner wall to promote vigorous and thorough mixing. Actuated ball valves at the inlet and outlet of the dissolution vessel allows for remote and automatic control. The dissolution vessel optionally further comprises a nitrogen purge to conduct the dissolution under increased pressure (or to purge the vessel if necessary). The dissolution vessel operates in batch mode. Generally speaking, the dissolution step tends to be the rate-limiting step of the system. By optimizing the parameters such as the plastic-to-solvent ratio, mixing speed, dissolution time, temperature, and pressure within the dissolution vessel, a rapid dissolution and drainage can be achieved which allows the system to operate in a semi-continuous mode. That is, while incoming feedstock is treated batch-wise in the dissolution step, the remaining steps can be conducted continuously. Thus, by optimizing the speed at which the dissolution chamber is operated versus the additional downstream processing steps, the overall process is largely continuous. In FIG. 5, the yield of dissolution of a single, targeted plastic polymer component, under the conditions specified above, is shown. It can be seen that after 20 seconds complete dissolution is achieved.

Figure 6:
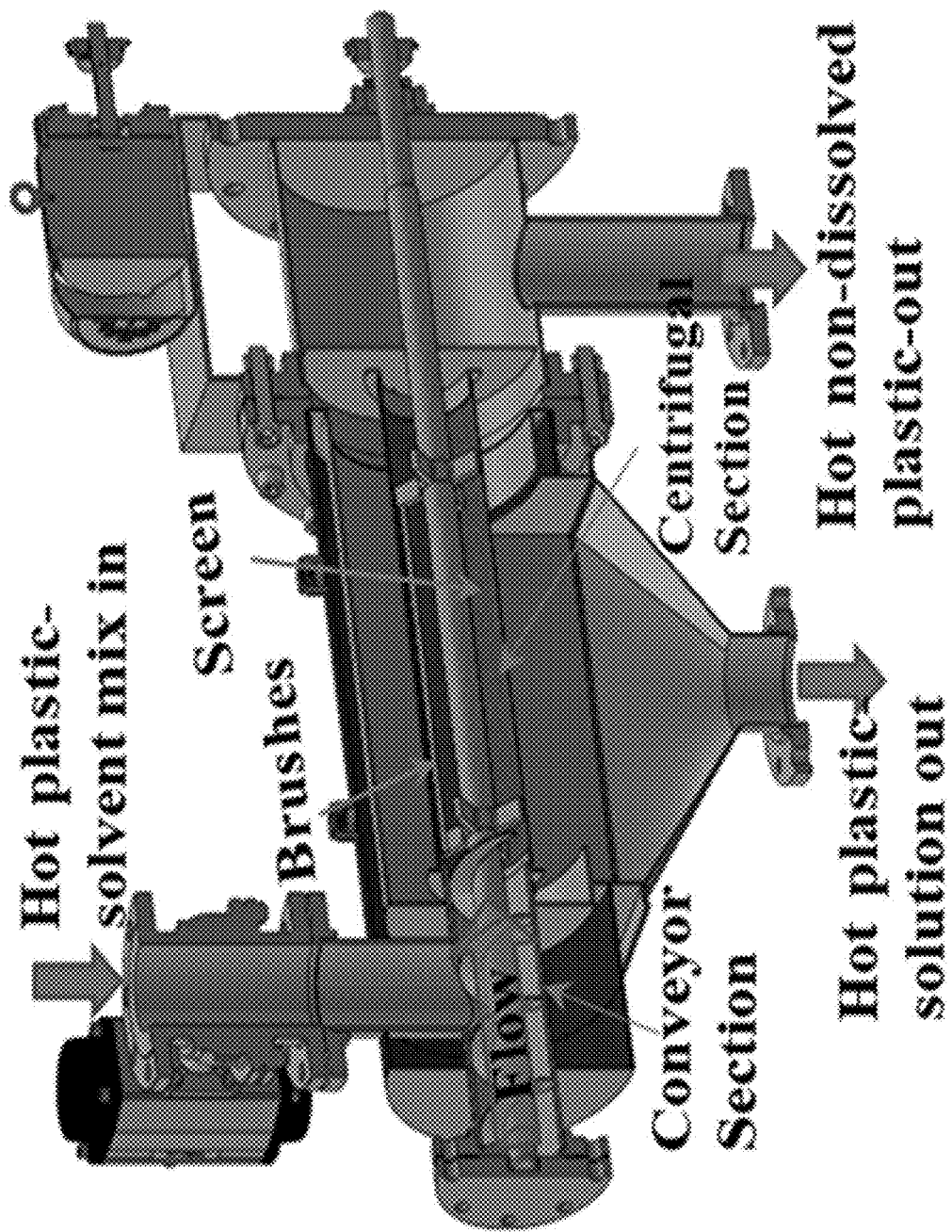
FIG. 6 shows the structure of a high-temperature centrifugal filter. Such a filter can be used to separate dissolved plastics from solid resins.

The plastic-solvent mixture from the dissolution vessel enters a high-temperature filter that separates undissolved plastics from the solvent solution containing the dissolved polymer component. The high-temperature filter (or hot filter) is a device that is configured to receive the plastic-solvent mixture from the dissolution vessel. The filter is temperature controlled and generally operated at an elevated temperature. It is dimensioned and configured to separate the remaining solid phase from the liquid phase. Any type of filter that can achieve this purpose is contemplated to be useful herein. An exemplary high-temperature filter is shown in FIG. 6, which is a centrifugal filter. The plastic-solvent mixture from the dissolution vessel enters the centrifugal filter from the left in FIG. 6 and is conveyed to a section having rotating paddles propelling the plastic-solvent mixture through a cylinder made of mesh. The liquid phase flows through the mesh and enters an outer, outlet channel. ("Hot plastic solution out" in FIG. 6.) The solid phase is retained by the mesh and is conveyed through the inner, central channel to another outlet channel, shown in the right in FIG. 6 as "Hot non-dissolved plastic out."

Note that the incoming plastics contain various types of inks and colorants. It is essential to produce recycled resins that minimize to the extent possible any retained inks or colorants. Currently, these inks and colorants fall into three general categories: (i) Those that dissolve in the same selected solvent that dissolves a specific resin, and will not precipitate at room temperatures. These inks and colorants will pass through the filter with the dissolved plastic solution. Because they do not precipitate at room temperatures, the precipitated resin will be void of these inks and colorants; (ii) Those that dissolve in the same selected solvent that dissolves a specific resin and will precipitate at room temperature together with the resin (and contaminate it). These inks and colorants will pass through the filter with the dissolved resin. To remove these impurities in the resin, the mixture must pass through another STRAP cycle, this time using a different solvent that selectively dissolves the inks and colorants; (iii) Those that are micron-sized particles that do not dissolve in the selected solvent and will be separated from the targeted resin using filters that are 1 to 400 microns (according to the actual sizes of the pigment particles). After each operation, there will be some impurities left in the recycled solvent. However, because these impurities are present in only minute concentrations, the solvent solution requires only occasional cleaning through distillation.

Figure 7:
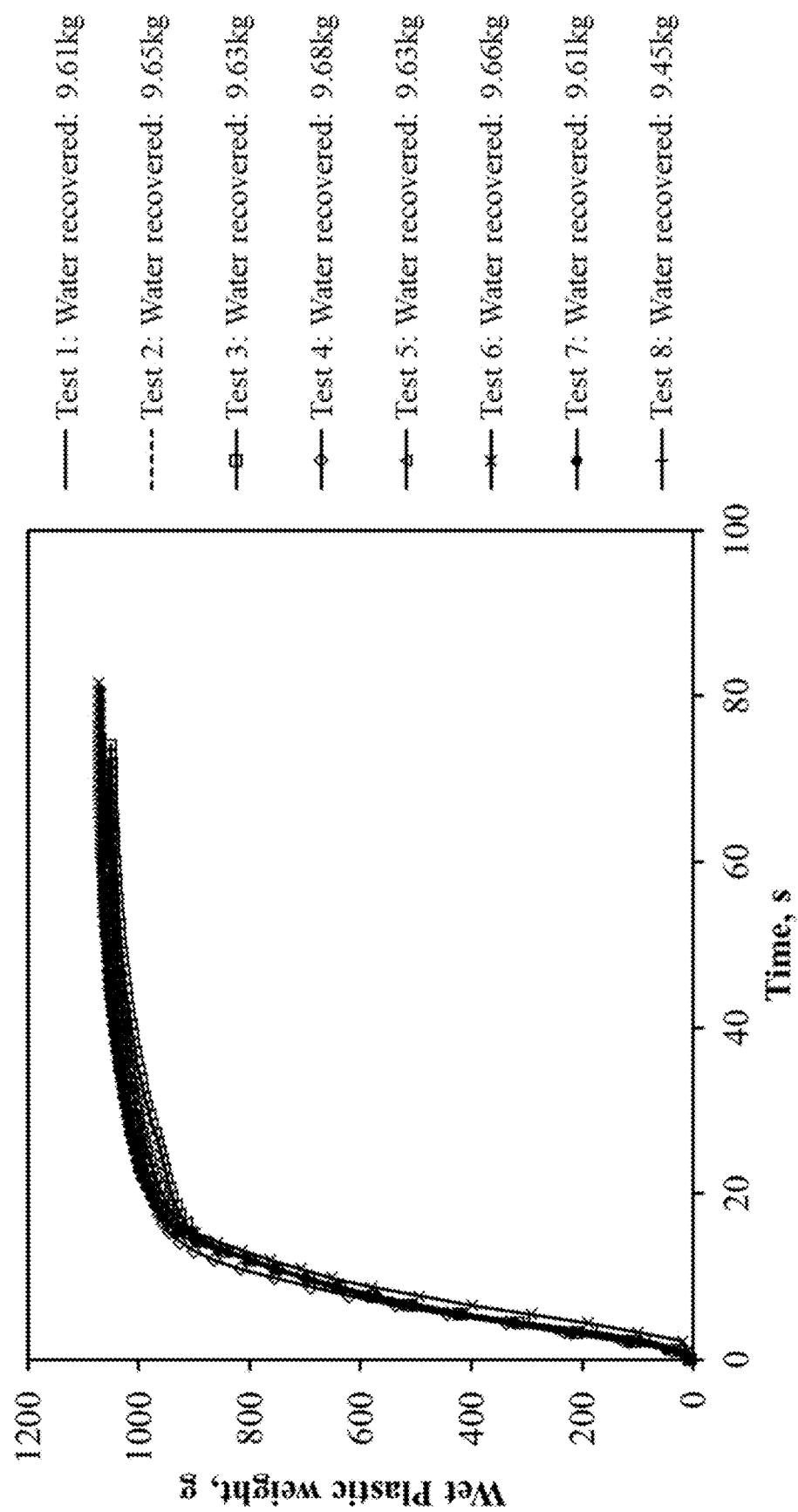
FIG. 7 shows test results (time vs. wet plastic weight) of the centrifugal filter shown in FIG. 6 by adding a mixture of 750 g shredded dry plastic and 10 L (about 10 kg) of water. The test was conducted repeatedly eight (8) times.

FIG. 7 shows test results of the centrifugal filter shown in FIG. 6 receiving a mixture of 750 g shredded dry plastic and 10 L (about 10 kg) of water. The results showed that after filtration the weight of the plastics increased by about 30% due to water intake. This experiment shows that a considerable amount of solvent (roughly 30% by weight of the incoming dry plastic) remains in the solid phase after filtration. A recovery unit is thus needed to recover the solvent from the wet plastics. The recovered solvent is recycled back into the system to reduce the total solvent consumption of the process.

After the dissolved polymer component is separated from the undissolved plastics, it enters a precipitator to cool the solvent, thereby precipitating the dissolved polymer component. In some cases, the polymer component can be precipitated by simply changing the temperature, i.e., lowering the temperature. In some cases, a cosolvent (i.e., an antisolvent) is added to render the dissolved polymer component insoluble. Preferably, the precipitator has a high cooling efficiency and twin-screw design for self-cleaning. The residence time and temperature of the precipitator can be optimized to achieve full precipitation with a small footprint.

The precipitated polymer component is separated from the solvent by a low-temperature filter (or cold filter) following the precipitator. The low-temperature filter can have a similar configuration with the high-temperature filter, but the capability to process materials with an elevated temperature is not required. Again, after filtration, the precipitated polymer component may still contain a significant amount of solvent. A solvent recovery unit is needed to recover the solvent for reuse.

The system typically (but optionally) includes an extruder after the final solvent recovery unit to extrude the reclaimed polymer into uniformly sized pellets. Extruding the precipitated polymer fraction also helps to remove (by vaporization) at least part of any solvent remaining in the polymer.

Figure 8:
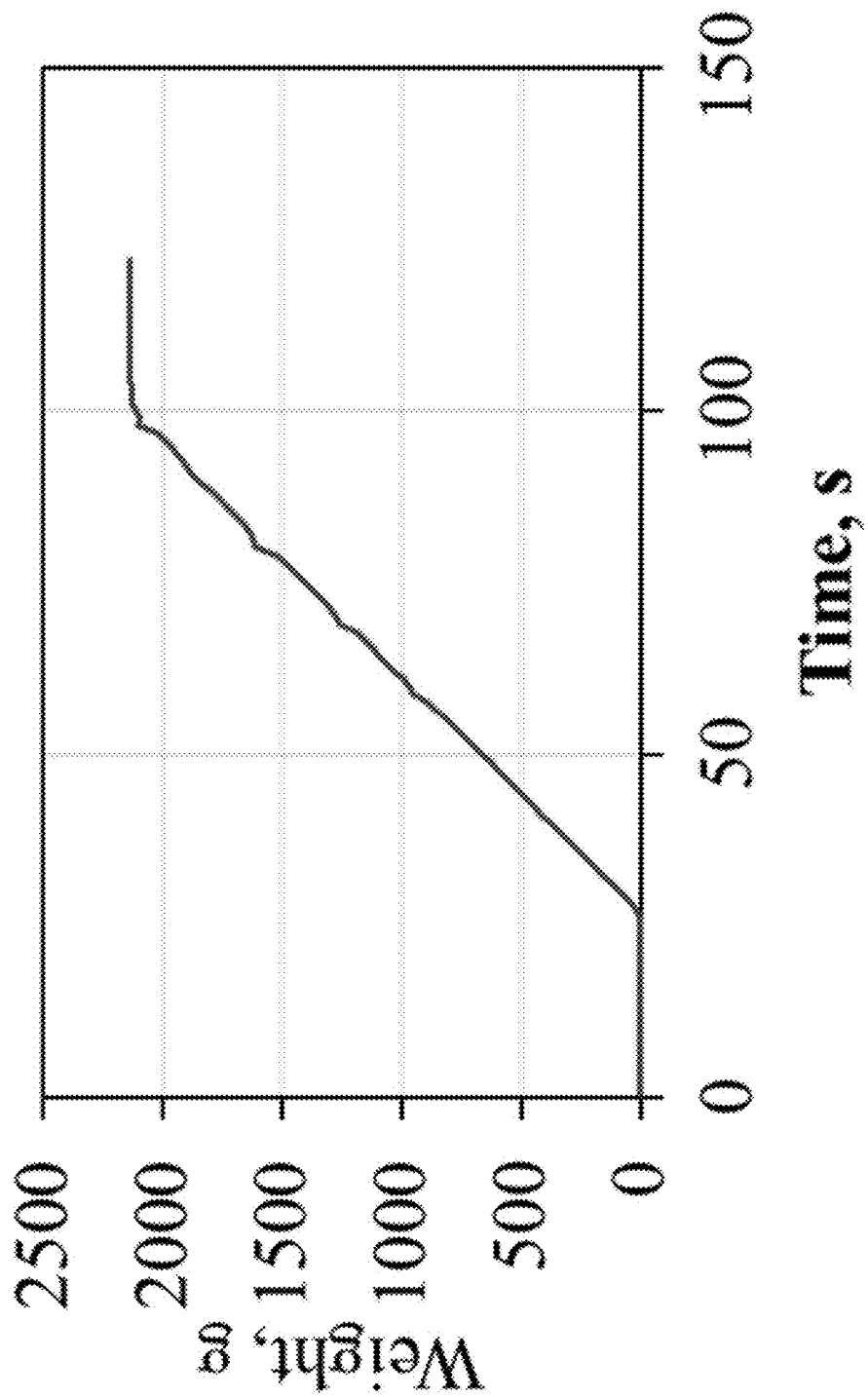
FIG. 8 shows the weight of plastics processed by an actuated ball valve auger over time.

The system may further comprise other components to assist smooth, continuous, and efficient processing of the composite feedstock, such as solvent storage tanks, distillation units, heat management systems, augers, etc. The system may comprise one or more solvent storage tanks to store, collect and reuse the solvent. A heat management system controls the temperature of the solvent storage tanks, dissolution vessel, high-temperature filter, precipitator, and solvent recovery units. A distillation unit can be used to purify the solvents for reuse when required. The system may further comprise augers to convey the materials continuously from one component to the next. For example, FIG. 8 shows a test result of a 4" auger having a 4" actuated ball valve, which has a mass flow rate of about 1.8 kg/min. As shown in FIG. 8, it displays a linear delivery of feedstock over time.

Use of the System to Carry Out the STRAP Process

The solvent-targeted recovery and precipitation (STRAP) process is a method to deconstruct multilayer plastic films or mixed plastic wastes into their constituent resins via a series of solvent washes. The general principle underlying the STRAP process is to selectively dissolve a single polymer component in a solvent system in which the targeted polymer component is soluble, but the other polymer components are not. The solubilized polymer component is then separated from the multilayer film or mixed plastic waste by mechanical filtration and precipitated by changing the temperature and/or adding a cosolvent (i.e., an antisolvent) that renders the dissolved polymer insoluble. The solvent and antisolvent are recovered and reused, and the targeted polymer component is recovered as a dry, pure solid resin. This process is repeated for each of the polymer components in the multilayer film or mixed plastic waste, resulting in several segregated streams that can then be recycled.

The STRAP method can be used to separate and recover polymer components in any multilayer films or mixed plastic wastes, in which the polymer components may include, but are not limited to, polyethylene (PE), ethylene viny alcohol (EVOH), polyethylene terephthalate (PET), polypropene (PP), polyvinyl chloride (PVC), polyamide (PA), polyethylene terephthalate glycol (PETG), polystyrene (PS), polycarbonate (PC), polyether sulfone (PES), polyoxymethylene (POM), polyetherimide (PEI), polyphenylene oxide (PPO), polyphenylene sulfide (PPS), polyvinylidene fluoride (PVDF), polytetrafluoroethylene (PTFE), nylon, styrene maleic anhydride (SMA), and styrene acrylonitrile (SAN). Among these polymers, PE is often classified by its density and branching, including ultra-high-molecular-weight polyethylene (UHMWPE), ultra-low-molecular-weight polyethylene (ULMWPE or PE-WAX), high-molecular-weight polyethylene (HMWPE), high-density polyethylene (HDPE), high-density cross-linked polyethylene (HDXLPE), cross-linked polyethylene (PEX or XLPE), medium-density polyethylene (MDPE), linear low-density polyethylene (LLDPE), low-density polyethylene (LDPE), very-low-density polyethylene (VLDPE), and chlorinated polyethylene (CPE). All of these types of polyethylene are included within the definition of the unadorned word polyethylene ("PE") as used herein.

The multilayer plastic films may further comprise any number of tie layers (also known as adhesive films), such as ethylene vinyl acetate (EVA), wet bond adhesives, and additives (such as $TiO_2$) that may be present in small quantities compared with the principal resin fractions (typically <1 wt % of the total composition).

Selective solvents used in the method can be any common industrial solvents, including, but not limited to, toluene, o-xylene, p-xylene, benzene, cyclohexane, n-butanol, dimethylformamide (DMF), tetrahydrofurfuryl alcohol, dimethyl sulfoxide (DMSO), tetrahydrofuran (THF), N-Methyl-2-Pyrrolidone (NMP), γ-valerolactone (GVL), acetone, 1-propanol, isopropyl alcohol (IPA), methanol, water, furfural, acetonitrile, 1,4-dioxane, cyrene, and dihydropyran.

The key to successful implementation of the STRAP process is the ability to preselect solvent systems and temperatures capable of selectively dissolving a single polymer component from among all the components present in a multilayer film or mixed plastic waste. A guided approach to rationally select solvents using calculations of Hansen solubility parameters (HSPs), molecular dynamics (MD) simulations, and a combined quantum chemical and statistical mechanical approach called the conductor-like screening model for realistic solvents (COSMO-RS) can be used to preselect the solvent system as described in Walker et al., *Sci. Adv.* 2020; 6: eaba7599 and Sanchez-Rivera et al., *ChemSusChem* 2021, 14, 4317-4329.

The system of the present disclosure can be used to carry out the STRAP process to recover one or more polymer components from the multiplayer films or mixed plastic wastes. Using the system described herein, a first polymer component is recovered using a first solvent that selectively dissolves the first polymer component. The undissolved plastics resulted from the process is then submitted to a parallel subsystem to recover a second polymer component using a second solvent that selectively dissolves the second polymer component. The system can comprise one or more parallel subsystems to sequentially recover one or more polymer components from the multilayer plastic film or mixed plastic waste.

The following are exemplary STRAP processes that can be carried out using the system disclosed herein. The examples are not to limit the scope of the processes that the system can carry out. The temperature and reaction time in the examples can be further optimized according to the parameters of the components of the system.

1. A process of separating and recovering polymer components from multilayer plastic films comprising PE, EVOH, and PET. The process comprises:
   (i) selectively dissolving the PE fraction in toluene at about 110° C. for about 5 min or less, and separating the solubilized fraction from the EVOH and PET by filtration;
   (ii) precipitating the solubilized PE by lowering the temperature of the toluene solution containing the dissolved PE to about 35° C., and separating the precipitated PE from toluene by filtration;
   (iii) selectively dissolving the EVOH fraction in 60% DMSO-40% water (v/v) at about 95° C. for about 5 min or less, and separating the solubilized fraction from the remaining PET by filtration;
   (iv) precipitating the solubilized EVOH fraction by lowering the temperature of the DMSO-water solution containing the dissolved EVOH to about 35° C., and separating the precipitated EVOH from the DMSO-water solvent by filtration; and
   (v) the residual solid is PET.

2. A process of separating and recovering polymer components from multilayer films comprising PE, EVOH, PET, and a tie layer of EVA. The process comprises:
(i) selectively dissolving the PE and EVA fraction in toluene at about 110° C. for about 5 min or less, and separating the solubilized fraction from the EVOH and PET by filtration;
(ii) precipitating the solubilized PE by lowering the temperature of the toluene solution containing the dissolved PE and EVA to about 35° C., and separating the precipitated PE from the toluene solution containing EVA by filtration;
(iii) precipitating the solubilized EVA by adding antisolvent acetone, and separating the precipitated EVA from toluene by filtration;
(iv) selectively dissolving the EVOH fraction in 60% DMSO-40% water (v/v) at about 95° C. for about 5 min or less, and separating the solubilized fraction from the remaining PET by filtration;
(v) precipitating the solubilized EVOH fraction by lowering the temperature of the DMSO-water solution containing the dissolved EVOH to about 35° C., and separating the precipitated EVOH from the DMSO-water solvent by filtration; and
(vi) the residual solid is PET.

3. A process of separating and recovering polymer components from multilayer films comprising PETG, PE, EVOH, and PET. The process comprises:
(i) selectively dissolving the PETG fraction in a mixture of 60% DMF-40% THF (v/v) at about 87° C. for about 5 min or less, and separating the solubilized fraction from the PE, EVOH, and PET by filtration;
(ii) precipitating the solubilized PETG by adding antisolvent 1-propanol, and separating the precipitated PETG from the DMF-THF solvent by filtration;
(iii) selectively dissolving the PE fraction in toluene at about 110° C. for about 5 min or less, and separating the solubilized fraction from the EVOH and PET by filtration;
(iv) precipitating the solubilized PE by lowering the temperature of the toluene solution containing the dissolved PE to about 35° C., and separating the precipitated PE from toluene by filtration;
(v) selectively dissolving the EVOH fraction in a mixture of 60% DMSO-40% water (v/v) at about 95° C. for about 5 min or less, then separating the solubilized fraction from the remaining PET by filtration;
(vi) precipitating the solubilized EVOH by reducing the temperature of the DMSO-water solution containing the dissolved EVOH to about 35° C., and separating the precipitated EVOH from the DMSO-water solvent by filtration; and
(vii) the residual solid is PET.

4. A process of separating and recovering PE and PP from mixed plastic waste comprising PE, PP, PVC, PET and PA. The process comprises:
(i) selectively dissolving the PE fraction in dodecane at about 100° C. for about 5 min or less, then separating the solubilized fraction from the PP, PVC, PET and PA by filtration;
(ii) precipitating the solubilized PE by lowering the temperature of the dodecane solution containing the dissolved PE to about 35° C., and separating the precipitated PE from dodecane by filtration;
(iii) selectively dissolving the PP fraction in toluene at about 110° C. for about 5 min or less, then separating the solubilized fraction from the PVC, PET and PA by filtration; and
(iv) precipitating the solubilized PP by lowering the temperature of the toluene solution containing the dissolved PP to about 35° C., and separating the precipitated PP from toluene by filtration.

The system of the present disclosure can also be used for removal of ink from printed plastics as well as dissolve lipids if available. For example, inks in a multiplayer plastic film comprising PE, EVOH, and PET can be removed by treating the multilayer film in 50% THF-50% DMF (v/v) at about 83° C. for about 5 min or less. The PE, EVOH and PET polymers are not dissolved in the THF-DMF solvent and can be separated from the solvent solution containing the ink by filtration. The polymer components of PE, EVOH, and PET can be further recovered from the deinked plastic film by the STRAP process described above.

EXAMPLES

Figure 9:
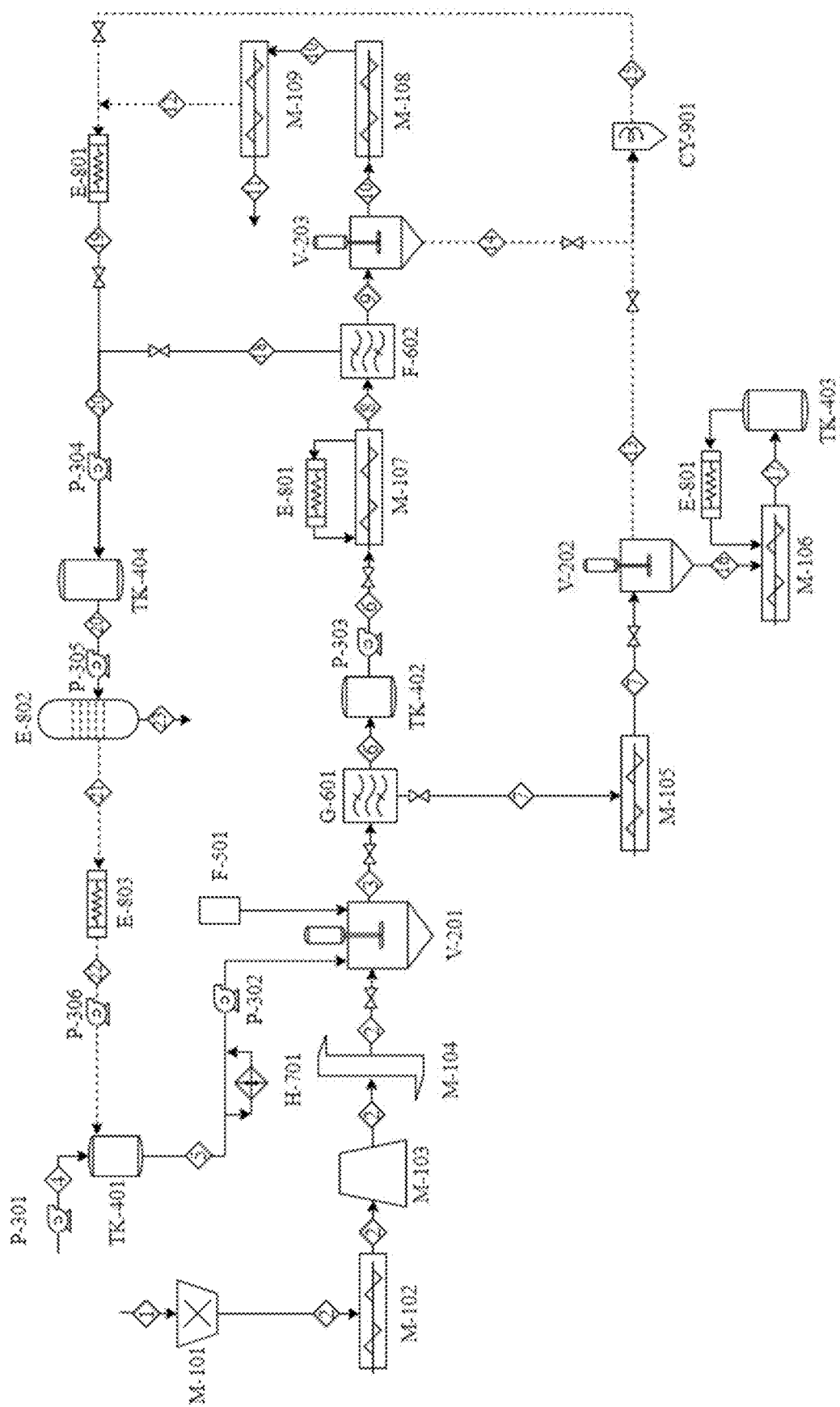
FIG. 9 shows a fully detailed process flow diagram of an exemplary system to recover polyethylene (PE) from mixed plastic waste.

This Example shows an exemplary system according to the present disclosure to recover PE from a mixed plastic waste using dodecane as the selective solvent and precipitating the dissolved PE by lowering the temperature of the solvent solution. A flow diagram of the exemplary system is shown in FIG. 9. The symbols of equipment included in FIG. 9 are listed in Table 1. The temperature and component flow rate of the streams 1-20 shown in diamond symbols of FIG. 9 are listed in Table 2.

As shown FIG. 9 and Table 2, the mixed plastic waste incoming in stream 1 is shredded to a size of about 4.0 mm by a shredder (M-101) and conveyed to a dissolution vessel (V-201) via stream 2 containing a live-bottom hopper (M-103). The PE fraction is dissolved in dodecane in the dissolution vessel (V-201) at about 90° C. Stream 3 coming out of the dissolution vessel (V-201) enters a hot filter (G-601), wherein the plastic-solvent mixture is separated to stream 6 which is the dodecane solution containing the dissolved PE, and stream 7 which is the undissolved plastics. Stream 6 enters a precipitator (M-107) in which the temperature of the dodecane solution is lowered to about 35° C. to precipitate the dissolved PE. Stream 8 from the precipitator (M-107) enters a cold filter (F-602) in which the precipitated PE is separated from dodecane to yield stream 9 containing the precipitated PE and stream 18 containing the dodecane solvent. The wet plastics in streams 7 and 9 each goes through a solvent recovery unit (V-202 and V-203, respectively) to recover dodecane by evaporation at about 100° C. The dried PE solids in stream 10 then enters an extruder (M-109) to produce recycled PE resins in stream 11.

The mass balance of the system shows that after each cycle, about 0.1 kg (equivalent to about 0.002%) of solvent and about 2.3 kg (equivalent to about 0.7%) of PE are lost. Overall, this Example demonstrates that the system recovers the PE polymer from the mixed plastic waste effectively. The system is also effective in recovering the solvent such that the cost of solvent can be reduced by recycling and reusing the recovered solvent.

TABLE 1

List of equipment in FIG. 9.

| Item | Description |
|---|---|
| M-101 | Shredder |
| M-102 | Screw auger |
| M-103 | Live-bottom hopper |
| M-104 | Bucket elevator |
| M-105 | Screw auger |
| M-106 | Screw auger |
| M-107 | Precipitator |
| M-108 | Screw auger |
| M-109 | Extruder |
| V-201 | Dissolution vessel |
| V-202 | Solvent recovery system (a) |
| V-203 | Solvent recovery system (b) |
| P-301 | Centrifugal pump |
| P-302 | Centrifugal pump |
| P-303 | Centrifugal pump |
| P-304 | Centrifugal pump |
| P-305 | Centrifugal pump |
| P-306 | Centrifugal pump |
| TK-401 | Solvent storage tank |
| TK-402 | Hot solvent/PE solution tank |
| TK-403 | Non-dissolved plastic storage tank |
| TK-404 | Solvent buffer tank |
| F-501 | Nitrogen generator |
| G-601 | Hot filter |
| F-602 | Cold filter |
| H-701 | Heating system |
| E-801 | Water recirculation system |
| E-802 | Distillation system |
| E-803 | Condenser |
| CY-901 | Cyclone |

TABLE 2

Stream list of FIG. 9 and mass balance.

| Stream Number | 1 | 2 | 3 | 4 | 5 | 6 | 7 |
|---|---|---|---|---|---|---|---|
| Temperature (° C.) | 25 | 25 | 90 | 25 | 90 | 90 | 90 |
| Size (mm) |  | 4.0 | N/A | N/A | N/A | N/A | N/A |
| Component Flow Rate (kg/hr) | | | | | | | |
| Printed multi-layer film | 500.0 | 500.0 | 0.0 | 0.0 | 0.0 | 0.0 | 0.0 |
| Liquid fraction of dodecane | 0.0 | 0.0 | 5000.0 | 0.0 | 5000.0 | 4965.0 | 35.0 |
| Liquid fraction of recycled PE | 0.0 | 0.0 | 325.0 | 0.0 | 0.0 | 322.7 | 2.3 |
| Solid fraction of recycled PE | 0.0 | 0.0 | 0.0 | 0.0 | 0.0 | 0.0 | 0.0 |
| Multi-layer film without PE | 0.0 | 0.0 | 175.0 | 0.0 | 0.0 | 0.0 | 175.0 |

| Stream Number | 8 | 9 | 10 | 11 | 12 | 13 | 14 |
|---|---|---|---|---|---|---|---|
| Temperature (° C.) | 35 | 35 | 100 | 170 | 170 | 100 | 100 |
| Component Flow Rate (kg/hr) | | | | | | | |
| Liquid fraction of dodecane | 4965.0 | 64.5 | 0.065 | 0.0 | 0.0 | 0.0 | 0.0 |
| Vapor fraction of dodecane | 0.0 | 0.0 | 0.0 | 0.0 | 0.06 | 35.0 | 64.5 |
| Solid fraction of recycled PE | 322.7 | 322.7 | 322.7 | 0.0 | 0.0 | 0.0 | 0.0 |
| Multi-layer film without PE | 0.0 | 0.0 | 0.0 | 0.0 | 0.0 | 0.0 | 0.0 |
| Extruded PE | 0.0 | 0.0 | 0.0 | 322.7 | 0.0 | 0.0 | 0.0 |

| Stream Number | 15 | 16 | 17 | 18 | 19 | 20 |
|---|---|---|---|---|---|---|
| Temperature (° C.) | 100 | 100 | 35 | 35 | 35 | 35 |
| Component Flow Rate (kg/hr) | | | | | | |
| Liquid fraction of dodecane | 0.0 | 0.0 | 0.035 | 4900.5 | 99.5 | 5000.0 |
| Vapor fraction of dodecane | 99.4 | 0.0 | 0.0 | 0.0 | 0.0 | 0.0 |
| Solid fraction of recycled PE | 0.0 | 2.3 | 2.3 | 0.0 | 0.0 | 0.0 |
| Multi-layer film without PE | 0.0 | 175.0 | 175.0 | 0.0 | 0.0 | 0.0 |

What is claimed is:

1. A system to recover an individual polymer from a multilayer plastic film or a mixed plastic waste, comprising:
   (i) a down-sizing device that shreds the multilayer plastic film or the mixed plastic waste into plastic particles having a size and aspect ratio to be flowable;
   (ii) a feeder that conveys the plastic particles in a constant flow without bridging;
   (iii) a dissolution vessel that mixes the plastic particles with a solvent, wherein the solvent selectively dissolves an individual polymer component of the plastic particles;
   (iv) a first filter that separates the solvent containing the dissolved polymer component from undissolved plastic particles;
   (v) a precipitator that precipitates the dissolved polymer component; and
   (vi) a second filter that separates the precipitated polymer component from the solvent,
   wherein the feeder is a live-bottom hopper comprising a bin with negative angled walls that form a wider base than the top, and one or more variable pitch screws having increasing pitches along the flow of the plastic particles.

2. The system of claim 1, wherein the down-sizing device shreds the multilayer plastic film or the mixed plastic waste into plastic particles having a size of about 2 mm to 6 mm.

3. The system of claim 1, wherein the down-sizing device shreds the multilayer plastic film or the mixed plastic waste into plastic particles having an aspect ratio of about 1 to 1.5.

4. The system of claim 1, wherein the dissolution vessel is a conical reactor having a sidewall, an outlet with a diameter, and a transverse cross-sectional plane of the outlet, wherein the outlet-diameter-to-particle-size-of-incoming feedstock is a ratio greater than about 15, and the transverse cross-sectional plane of the outlet and the sidewall of the dissolution vessel define an angle of from about 45 degrees to about 90 degrees.

5. The system of claim 1, wherein the dissolution vessel comprises baffles attached to an inner wall to promote mixing.

6. The system of claim 1, wherein a high temperature centrifugal filter is used to separate the undissolved polymers and colorants from the solution.

7. The system of claim 1, wherein colorants present in the multilayer plastic film or the mixed plastic waste are not dissolved in the solvent.

8. The system of claim 1, wherein the dissolved polymer component is precipitated in the precipitator by lowering temperature of the solvent containing the dissolved polymer component.

9. The system of claim 1, wherein colorants present in the multilayer plastic film or the mixed plastic waste are dissolved in the solvent, but do not precipitate at room temperature.

10. The system of claim 1, wherein colorants present in the multilayer plastic film or the mixed plastic waste are dissolved in the selected solvent and precipitate at room temperature with the individual polymer component.

11. The system of claim 1, wherein the dissolved polymer component is precipitated in the precipitator by adding an antisolvent.

12. The system of claim 1, further comprising a distillation unit to purify the recovered solvent for reuse.

13. The system of claim 1, further comprising a first solvent recovery unit following the high temperature filter to recover the solvent from the undissolved plastic particles separated from the high temperature filter, and a second solvent recovery unit following the low temperature filter to recover the solvent from the precipitated polymer component separated from the low temperature filter.

14. The system of claim 13, further comprising an extruder following the second solvent recovery unit to extrude the polymer component to produce recycled plastic resin pellets and remove solvent from the polymer component.

15. The system of claim 13, further comprising a heat management system that controls temperature of the solvent entering the dissolution vessel, the dissolution vessel, the high temperature filter, the precipitator, and the first and second solvent recovery units.

16. The system of claim 13, further comprising a sequential subsystem comprising a second dissolution vessel, a second high temperature filter, a second precipitator, and a second low temperature filter, wherein undissolved plastic particles are conveyed to the second dissolution vessel to mix with a second solvent, wherein the second solvent selectively dissolves a second polymer component.

17. The system of claim 1, further comprising a sequential subsystem comprising a second dissolution vessel, a second high temperature filter, a second precipitator, and a second low temperature filter, wherein the undissolved plastic particles are conveyed to the second dissolution vessel to mix with a second solvent, wherein the second solvent selectively dissolves a second polymer component.

18. The system of claim 17, further comprising a distillation unit to purify the recovered solvent for reuse.

* * * * *